United States Patent [19]

Laconto, Sr. et al.

[11] Patent Number: 5,824,386

[45] Date of Patent: Oct. 20, 1998

[54] ZIRCONIA DISK SUBSTRATE HAVING HIGH SURFACE FINISH

[75] Inventors: Ronald W. Laconto, Sr., Leicester; Oh-Hun Kwon, Westboro, both of Mass.

[73] Assignee: Saint-Gobain/Norton Industrial Ceramics Corporation, Worcester, Mass.

[21] Appl. No.: 911,837

[22] Filed: Aug. 15, 1997

Related U.S. Application Data

[63] Continuation of Ser. No. 521,152, Aug. 29, 1995, abandoned.

[51] Int. Cl.$^6$ .......................................................... B32B 3/00
[52] U.S. Cl. ........................ 428/64.1; 428/65.3; 428/220; 428/407; 428/694 TR; 428/702
[58] Field of Search .................................. 428/64.1, 65.3, 428/220, 409, 694 TR, 694 BR, 701, 702

[56] References Cited

U.S. PATENT DOCUMENTS

| | | | |
|---|---|---|---|
| 4,681,813 | 7/1987 | Yamada | 428/450 |
| 4,738,885 | 4/1988 | Matsumoto | 428/64 |
| 5,080,948 | 1/1992 | Morita | 428/694 TR |
| 5,228,886 | 7/1993 | Zipperian | 51/293 |

FOREIGN PATENT DOCUMENTS

| | | |
|---|---|---|
| 131895 | 1/1985 | European Pat. Off. . |
| 2078716 | 4/1987 | Japan . |
| 1112518 | 5/1989 | Japan . |

*Primary Examiner*—Timothy M. Speer
*Attorney, Agent, or Firm*—Thomas M. DiMauro

[57] ABSTRACT

This invention relates to polishing YTZP zirconia disk substrates with colloidal silica to achieve a surface roughness Ra of no more than 8 angstroms.

6 Claims, No Drawings

ZIRCONIA DISK SUBSTRATE HAVING HIGH SURFACE FINISH

This application is a file wrapper continuation of U.S. Ser. No. 08/521,152, filed Aug. 29, 1995, now abandoned.

BACKGROUND OF THE INVENTION

In the information systems presently used in computers and word processors, data (i.e., programs and files) are stored and retrieved through the disk drive. The disk drive typically has three components: the read-write head ("head"), the actuator arm, and the hard magnetic disk ("disk"). In a conventional disk drive, the actuator arm directs the head over the disk so that the circuitry on the head can magnetically transmit bits of information between leads and the disk. In a conventional disk, a substrate (typically an Al/Mg alloy) has deposited thereon, consecutively, an electroless or anodized coating (Ni/P), a magnetic coating, a protective overcoat, and a liquid lubricant.

Due to the high density of information typically stored on a disk, the head must come very close to the disk during data transmission in order to insure accurate transfer. Accordingly, the space between the head and the disk (called a "flying height" or "air gap") is often between about 2–4 microinches. At such extremely small distances, both the head and the disk must be very flat. Thus, the material used for the disk should be very stiff and amenable to a fine finish.

When the disk and actuator arm move relative to each other, an air flow develops and allows the head to "float" above the disk. During operation, the head's ability to float prevents wear-inducing contact between the head and disk which degrades the accuracy of data transfer. However, the starting and stopping of the disk or arm often produces physical contact between the head and disk. Therefore, it is also desirable to make the disk substrate from a material which is wear resistant.

As noted above, most conventional disks are made from a Al/Mg alloy overcoated with a Ni/P magnetic film. This alloy has been selected as the material of choice for the disk due to its superior wear resistance, stiffness and polishability, and performs well in the current relatively large disk drives.

However, increasing speed and capacity requirements are forcing disk drives to become smaller and smaller. For example, the current hard disk is about 65–275 mm in diameter and 0.5 mm to 1.0 mm in thickness. In the future, the disk is expected to be about 50 mm in diameter and less than about 0.5 mm in thickness by 1997 and less than about 38 mm in diameter and less than about 0.4 mm in thickness by 2000. Likewise, the air gap will soon be reduced to no more than 2 microinches. At these dimensions, it is believed that use of Al/Mg alloys as disk substrates will be problematic in that the elastic modulus of Al/Mg alloys (only about 100 GPa) will not provide the stiffness required in the thin disks of the future (wherein the required stiffness will likely be at least about 200 GPa).

It is also known that a lower flying height allows for increased information density on the disk and that the recommended flying height is critically dependent upon the smoothness of the disk substrate. For example, when the selected disk substrate has a surface roughness Ra of about 40 angstroms Å, it has been suggested that a flying height be at least 1.25 microinches. In contrast, when the selected disk substrate has a surface roughness Ra of only about 10 angstroms Å, a flying height of about 0.5 microinches can be used. See FIG. 7 of "Designing media with alternative substrate materials" Data Storage, September 1994, pp. 35–40, FIG. 7.

Because of its high toughness, hardness and elastic modulus, the art has considered using zirconia partially stabilized by rare earth oxides (YTZP's). JP 62078716 discloses a YTZP zirconia magnetic disk substrate for use in disk drives. However, the surface roughness (Ra) of this material is reported to be only 0.01 um (100 angstroms Å). JP 62078715 discloses a YTZP zirconia magnetic disk substrate for use in disk drives. However, the low density of this material would likely yield an even more undesirable surface roughness (Ra).

EPO Patent Application 0 131 895 reports a YTZP zirconia magnetic disk substrate for use in disk drives. However, the best surface roughness (Ra) of any YTZP disk substrate disclosed therein is reported to be only 0.003 um (30 angstroms Å). JP 01112518 discloses a YTZP zirconia magnetic disk substrate for use in disk drives. However, the surface roughness (Ra) of this material is reported to be only 5–8 nm (50–80 angstroms Å).

U.S. Pat. No. 5,228,886 ("Zipperian") examined polishing advanced ceramics (including zirconia) with solutions comprising colloidal silica and reported that use of colloidal silica per se tends to produce substantial phase relief (i.e., roughness Ra on the order of 100 angstroms Å) on the product surface. See col. 1, lines 42–45 and col.3, lines 21–25 of Zipperian. Zipperian then recommended polishing zirconia with slurries comprising colloidal silica and an abrasive such as alumina, ceria, iron oxide and chromia to produce a highly polished surface substrate. However, recent laboratory experiments with commercial solutions of colloidal silica and iron oxide failed to produce surface finishes of less than 10 angstroms Å.

Accordingly, there is a need for a partially stabilized YTZP zirconia disk substrate having a surface roughness Ra of no more than 8 angstroms Å.

SUMMARY OF THE INVENTION

In accordance with the present invention, there is provided a disk substrate consisting essentially of zirconia partially stabilized by a rare earth oxide, the disk substrate having a surface roughness Ra of no more than 8 angstroms (Å), as measured by optical profilometry.

Also in accordance with the present invention, there is provided a process comprising the step of polishing a disk substrate consisting essentially of zirconia partially stabilized by a rare earth oxide, for between about 15 and 120 minutes with an aqueous solution consisting essentially of colloidal silica and water to produce a surface roughness Ra of no more than 20 angstroms Å, as measured by optical profilometry.

DETAILED DESCRIPTION OF THE INVENTION

It has been unexpectedly found that polishing a YTZP disk substrate with a slurry consisting essentially of colloidal silica and water can produce a surface roughness Ra on the substrate of no more than 8 angstroms, as measured by optical profilometry. This level of finish is superior to that achieved by polishing with 0.25 μm diamond (10 Å by contact profilometry), 0.5 μm alpha alumina (10 Å by contact profilometry), 0.07 μm alumina (50Å) and 1 μm ceria (CeO2) (200 Å). Moreover, the resulting finish is unexpected and surprising in light of Zipperian's warnings that polishing advanced ceramics with colloidal silica per se produced an undesirable, reliefed surface finish.

Without wishing to be tied to a theory, it is believed that conventional abrasive media such as diamond and alumina fail to provide the desired level of surface roughness Ra (even in fine grit size) because their removal action on YTZP zirconia is purely mechanical. It is believed the chemical-mechanical polishing reaction provided by colloidal silica on YTZP zirconia is required to reach the desired surface finish.

In preferred embodiments, a fully dense, partially-stabilized YTZP zirconia blank is lapped by conventional methods form about 30 to 60 minutes to a surface roughness Ra of about 100–2000 angstroms and then polished with colloidal silica to achieve the desired surface roughness. For example, in one embodiment of the present invention, a fully dense YTZP zirconia disk substrate is lapped with 22 $\mu$m alumina (on cast iron) and then with 5 $\mu$m alumina to a surface roughness Ra of about 100–1000 angstroms Å, and then polished with an aqueous solution of about 1–50 w/o colloidal silica for about 30–120 minutes to achieve a surface roughness Ra of between about 4 and 8 angstroms, typically between about 4 and 6 angstroms.

Preferably, commercial YTZP zirconias having a toughness of at least about 5 MPa m$^{1/2}$, preferably at least about 6 MPa m$^{1/2}$ (as measured by the Chantikul indentation strength method as disclosed in the *Journal of the American Ceramics Society*, 64(9), 1981, pp. 539–44) are used. More preferably, the YTZP zirconia is partially stabilized by a rare earth oxide at a concentration of between about 2.5 mol % and about 5 mol %. Most preferably, rare earth oxide is yttria. In some embodiments, the YTZP starting powder is 3Y-TZP, a yttria-containing zirconia powder available from Z-Tech of Bow, N.H. In some preferred embodiments, the zirconia is YZ110, a yttria-stabilized YTZP zirconia available from the Norton Company of Worcester, Mass. It is believed advantageous to have less than 0.3% impurity in the YTZP zirconia disk substrate. It has been found that chemically-derived YTZP powders available from Daiichi Kigensho K.K. of Osaka, Japan, provide the desired level of purity. Likewise, it is believed advantageous to have no more than 0.1% porosity in the YTZP zirconia disk substrate. It has been found that sintering followed by hot isostating pressing ("hipping") provides a YTZP zirconia disk substrate having no more than 0.1% porosity.

In one preferred method of making the YTZP zirconia disk substrate, rare earth oxide powder and zirconia powder are mixed, the mixture is cold isostatically pressed ("cipped") at between 50 and 400 MPa and then green machined to form a green 35 mm blank; the blank is then sintered at between about 1300° C. and 1500° C. for about 1–4 hours to achieve a density of at least 95%; and the sintered piece is hipped in an inert gas such as argon at between 1300° C. and 1500° C. for between 0.5 and 4 hours to achieve a density of at least 99.9%. After the ceramic body is densified it is made into a thin blank, preferably by slicing with a diamond saw. The slicing should produce a disk having an Ra of between about 2–7 $\mu$m and a thickness of less than about 1 mm, preferably less than about 0.7 mm.

Before the YTZP zirconia disk substrate blank is polished, it is typically lapped to a finish of about 100–1000 angstroms. Factors believed to be influential in determining the surface characteristics of the lapped substrate include pressure, pH, additives, lapping speed and lapping media. Typical pressures range from about 1 psi to about 20 psi. Typical pH values range from about 7 to about 12. Typical additives include stabilizing agents. Typical lapping speeds range from 100 rpm to about 500 rpm. Typical lapping media include alumina, silicon carbide and boron carbide.

In some embodiments, the partially stabilized YTZP zirconia disk substrate is lapped with successively finer alumina media to produce a surface roughness Ra of about 100–1000 angstroms. In one embodiment, the disk substrate is lapped with 12 $\mu$m alumina under 3 psi for about 30 minutes (to produce a 1–2 pm/min removal rate and a surface roughness Ra of between about 1200 and 1600 angstroms), lapped with 5 $\mu$m alumina for about 30 minutes (to produce a similar removal rate, a surface roughness Ra of between about 880 and about 890 angstroms and a flatness of better than 2 $\mu$m on 65 mm diameter disk substrates), and then lapped with 3 $\mu$m and 1 $\mu$m alumina (resulting in surface roughness Ra values of about 450 and 110 angstroms, respectively). In more preferred embodiments, lapping is performed simultaneously on both sides of the disk substrate by a Model AC 1000 SH grinding machine, available from Peter Wolters of Plainville, Mass., at a pH of 7–12, and a speed of 100–500 rpm.

A number of factors are considered important to the polishing step. These include wheel load; polishing time; polishing medium type, size and concentration; and, pad type.

In the polishing step, the lapped disk substrates are typically placed on fibrous pads which are fixed within the polishing machine to retain the polishing media. Preferred pads include the SUBA 500 pad, available from Rodel of Newark, Del.

Next, an aqueous solution containing between about 2 w/o and about 50 w/o, and preferably between about 10 w/o and about 25 w/o, colloidal silica is dripped onto the plates of the polishing machine. In one embodiment, NALCO 2350 colloidal silica, available from NALCO of Naperville, Ill., is used and its pH is adjusted to between about 7 and 12, preferably about 10.1. In another embodiment, Syton 500S, available from Optical Manufacturer's International of Downers Grove, Ill., is used.

Once the disk substrates have been placed on the pads and the colloidal silica has been added, the polishing begins. Polishing is generally undertaken at a load of between about 1.5 psi and about 18.5 psi, preferably between about 1 and 10 psi, for between about 15 and about 120 minutes. In general, it has been found that longer polishing times combined with lower loads produced the finest finishes.

It has also been found that practicing the present invention as described above can yield very thin disk substrates. Since thin disk substrates lead to reduced material cost, component weight, in-use vibration and in-use power consumption, they are considered by the industry to be superior to thicker disk substrates. In the case of the present invention, it has been found that 65 mm YTZP zirconia disks having a thickness as low as about 7.5–10 mils (about 190–250 $\mu$m) can be produced (in contrast to conventional glass or aluminum disk substrates which are about 25 mils thick). Since the disk substrates of the present invention have high elastic modulus, it is believed they can withstand high disk revolution speeds (i.e., 10,000 rpm) and high shock (i.e., 1000 G) despite their thinness.

For the purposes of the present invention, a "surface roughness Ra" is considered to be the mean height deviation from the normal surface of the zirconia disk substrate. Unless otherwise stated, the surface roughness Ra is measured by means of an optical profilometer, in particular a white light interference microscope such as those available from Zygo Corp. of Middlefield, Conn.

COMPARATIVE EXAMPLE I

A YZ110-H blank rod having a 1.5" diameter and a 3" length, available from the Norton Company of Worcester, Mass., was sliced with a diamond saw. The slice was first ground with a 320 grit diamond wheel to produce a surface roughness Ra of about 0.110 μm. Next, the ground slice was serially lapped and polished with diamond on a 12 inch lapping machine according to the following specifications:

| Slice | Grit Size μm | Wheel type | Speed rpm | Pressure psi | Duration min | Ra μm |
|---|---|---|---|---|---|---|
| A | #320 | blank | | | | 0.110 |
| B | 40 | alumina | 100 | 20 | 4 | 0.130 |
| C | 30 | platen | 25 | 25 | 3 | 0.028 |
| D | 9 | platen | 125 | 25 | 2 | 0.020 |
| E | 3 | texmet | 200 | 30 | 1.2 | 0.012 |
| F | 1 | cloth | 300 | 45 | 1.2 | 0.008 |
| G | 0.25 | cloth | 400 | 60 | <1 | 0.005 |

None of the test slices achieved the desired surface roughness Ra.

COMPARATIVE EXAMPLE II

Two Y-TZP powders (a 3Y-TZP from Z-Tech and a 4Y-TZP from Daiichi) were cipped at 200 MPa to form green rods, sintered in air at 1350° for 60 minutes to achieve at least 98% density, and hipped in argon at 1350° C. and 200 MPa for about 45 minutes to produce rods having a density of at least 99.9%.

These dense rods were then sliced into disks of 25.4 mm diameter and 0.8 mm thickness and ground with #500 grit resin bonded diamond wheels. The ground disk blanks were lapped using 9.5 μm alumina grit on a cast iron lapping wheel having alumina slurry continuously dripping on the wheel. Lapping for about 30 minutes provided a surface roughness of about 800 angstroms.

The lapped slices were then final-polished with a 0.05 μm alumina/diamond paste to a surface roughness Ra of 10 angstroms, as measured by a commercially available contact profilometer.

COMPARATIVE EXAMPLE III

Similar slices were made and ground as in Comparative Example II, but were lapped with only 9.5 μm alumina and final polished with only 50 nm alumina. The resulting disk substrate has a surface roughness Ra of about 10 angstroms, as measured by a commercially available contact profilometer.

COMPARATIVE EXAMPLE IV

In the following experiments, fully dense, partially stabilized YTZP zirconia disk substrates made from Daiichi 4Y-YTZP powder were lapped with alumina to a surface roughness of about 800 angstroms and then polished with a commercial colloidal silica/iron oxide formulation available from Buehler, Ltd. of Lake Bluff, Ill. on an AC500 polishing machine from Peter Wolters using a SUBA 500 pad in accordance with the conditions set out below:

| YTZP Substrate | Colloidal Silica | pH | Time (min) | Load (psi) | Ra (Å) |
|---|---|---|---|---|---|
| 4Y | R111 | 10.1 | 30 min | 18 | 14–16 |
| 4Y | R111 | 10.1 | 45 min | 18 | 13–14 |
| 4Y | R111 | 11 | 30 min | 18.2 | 15–17 |
| 4Y | R111 | 10.1 | 45 min | 18.5 | 12–14 |
| 4Y | R111 | 10.1 | 90 min | 18.5 | 10–13 |

EXAMPLE I

In the following experiments, fully dense, partially stabilized YTZP zirconia disk substrates made from Daiichi 4Y-YTZP powder were lapped with alumina to a surface roughness of about 800 angstroms and then polished with NALCO colloidal silica on an AC500 model polishing machine from Peter Wolters using a SUBA 500 pad in accordance with the conditions set out below:

| pH | Time (min) | Load (psi) | Ra (Å) |
|---|---|---|---|
| 10.1 | 30 min | 18.5 | 12–15 |
| 10.1 | 60 min | 18.5 | 11–12 |

Comparing the 30 minute experiment of this example with its counterpart in Comparative Example IV leads to the conclusion that polishing with an aqueous solution consisting essentially of colloidal silica and water provided a slightly better surface finish than polishing with an aqueous solution comprising colloidal silica, water and a another abrasive. This conclusion is in direct contrast with the teaching of Zipperian.

EXAMPLE II

In the following experiments, fully dense, partially stabilized YTZP zirconia disk substrates were lapped with alumina to a surface roughness of about 800 angstroms and then polished with an aqueous solution of Syton colloidal silica on a AC 500 model polishing machine from Peter Wolters using a SUBA 500 pad in the pH range of 8–9 in accordance with the conditions set out below:

| YTZP Substrate | Time (min) | Load (psi) | Ra (Å) |
|---|---|---|---|
| ZTech 3Y-TZP | 30 | 1.5 | 10–11 |
| Daiichi 4Y-TZP | 60 | 3.0 | 10–11 |

Comparing Example I with Example II, it can be seen that Example II was run at lower loads and produced finer finishes. Therefore, it is believed the lower loads prescribed in Example II are responsible for the superior finishes.

EXAMPLE III

In the following experiments, fully dense, partially stabilized YTZP zirconia disk substrates having about 0.06 wt % impurities and made from Z-Tech 3Y-TZP powders were lapped with alumina to a surface roughness of about 800 angstroms and then polished with an aqueous solution of Syton colloidal silica on a AC 500 model polishing machine from Peter Wolters with a SUBA 500 pad in the pH range of 8–9 in accordance with the conditions set out below:

| Time (min) | Load (psi) | Ra (Å) |
|---|---|---|
| 60 | 3.0 | 6–7 |
| 90 | 3.0 | 7–8 |

Comparing with Example II, it can be seen that longer finishing times combined with use of Z-Tech powder provided for superior finishes in these experiments.

EXAMPLE IV

The following experiments were performed substantially similarly to those in Example III, except that the pH was set at 10.1:

| Time (min) | Load (psi) | Ra (Å) |
|---|---|---|
| 15 | 3.0 | 8–10 |
| 30 | 3.0 | 7–8 |
| 60 | 3.0 | 6–7 |
| 120 | 3.0 | 4–5 |

Comparing with Example III, we see that using a pH of about 10.1 provides an even better finish for these substrates.

EXAMPLE V

This experiment was performed substantially similarly to Example IV, except that the polishing media was undiluted Syton for 15 minutes and Syton diluted with water in a 1:1 ratio for 15 minutes. The resulting surface roughness Ra was 8.2 Å.

I claim:

1. A disk substrate consisting essentially of zirconia partially stabilized by a rare earth oxide, the disk substrate having a surface roughness Ra, as measured by optical profilometry, of no more than 8 angstroms and about 0.06 wt % impurities.

2. The disk substrate of claim 1 wherein the rare earth oxide is yttria.

3. The disk substrate of claim 1 having a thickness of no more than 250 μm.

4. The disk substrate of claim 1 having a surface roughness of between about 4 and 8 angstroms Å.

5. The disk substrate of claim 1 having a surface roughness of between about 4 and 6 angstroms Å.

6. The disk substrate of claim 1 having a porosity of no more than 0.1%.

* * * * *